(12) United States Patent
Skalsky

(10) Patent No.: US 8,671,171 B2
(45) Date of Patent: Mar. 11, 2014

(54) WIRELESS CONFIGURATION FOR A COMPUTING DEVICE

(75) Inventor: Nathan C. Skalsky, Durham, NC (US)

(73) Assignee: International Business Machines Corporation, Armonk, NY (US)

(*) Notice: Subject to any disclaimer, the term of this patent is extended or adjusted under 35 U.S.C. 154(b) by 70 days.

(21) Appl. No.: 13/309,230

(22) Filed: Dec. 1, 2011

(65) Prior Publication Data

US 2013/0144991 A1 Jun. 6, 2013

(51) Int. Cl.
*G06F 15/177* (2006.01)

(52) U.S. Cl.
USPC .......................................... 709/221; 709/222

(58) Field of Classification Search
None
See application file for complete search history.

(56) References Cited

U.S. PATENT DOCUMENTS

| | | | |
|---|---|---|---|
| 7,106,175 B2 | 9/2006 | Lewis | |
| 7,107,019 B2 | 9/2006 | Tandy | |
| 7,395,975 B2* | 7/2008 | Ito | 235/492 |
| 7,418,272 B2* | 8/2008 | Son | 455/558 |
| 7,460,076 B2* | 12/2008 | Hayes et al. | 343/702 |
| 7,503,505 B2* | 3/2009 | Koyama et al. | 235/492 |
| 7,612,670 B2 | 11/2009 | Klein | |
| 7,679,514 B2* | 3/2010 | Rofougaran et al. | 340/572.2 |
| 8,061,625 B2* | 11/2011 | Yu et al. | 235/492 |
| 2005/0101309 A1 | 5/2005 | Croome | |
| 2005/0212690 A1* | 9/2005 | Nishikawa | 340/932.2 |
| 2005/0251798 A1 | 11/2005 | Fraley | |
| 2006/0071070 A1 | 4/2006 | Maier | |
| 2006/0101456 A1 | 5/2006 | Crosier et al. | |
| 2007/0049338 A1* | 3/2007 | He et al. | 455/557 |
| 2007/0050637 A1* | 3/2007 | Arai et al. | 713/186 |
| 2007/0070934 A1 | 3/2007 | van Rooyen | |
| 2007/0213096 A1* | 9/2007 | Bella et al. | 455/558 |
| 2007/0293188 A1* | 12/2007 | Houghton et al. | 455/404.2 |
| 2007/0298714 A1* | 12/2007 | Chiu | 455/41.2 |
| 2008/0065805 A1* | 3/2008 | Wu et al. | 710/301 |
| 2008/0076474 A1* | 3/2008 | Ho | 455/558 |
| 2008/0126570 A1* | 5/2008 | Fujii et al. | 709/250 |
| 2008/0143623 A1* | 6/2008 | Pintos et al. | 343/767 |
| 2008/0159189 A1* | 7/2008 | Hsu | 370/310 |
| 2008/0320187 A1* | 12/2008 | Kim et al. | 710/100 |
| 2009/0009421 A1* | 1/2009 | Suprunov et al. | 343/881 |
| 2009/0063340 A1* | 3/2009 | Chiang | 705/41 |
| 2009/0102741 A1* | 4/2009 | Li et al. | 343/866 |
| 2009/0243813 A1 | 10/2009 | Smith et al. | |
| 2009/0260004 A1 | 10/2009 | Datta et al. | |
| 2010/0078485 A1* | 4/2010 | Li | 235/492 |
| 2010/0079253 A1 | 4/2010 | Phipps et al. | |
| 2010/0156639 A1 | 6/2010 | Herwig et al. | |
| 2010/0273528 A1* | 10/2010 | Yu et al. | 455/558 |
| 2011/0062227 A1 | 3/2011 | Bagai | |

* cited by examiner

*Primary Examiner* — Ninos Donabed
(74) *Attorney, Agent, or Firm* — Edward J. Lenart; Katherine S. Brown; Biggers Kennedy Lenart Spraggins LLP

(57) ABSTRACT

Wireless configuration for a computing device, the computing device including computer memory, a wireless receiver, and a device configuration management module, including: receiving, by the device configuration management module via the wireless receiver, configuration data for the computing device, wherein the computing device is packaged in original equipment manufacturer ('OEM') packaging; and storing, by the device configuration management module, the configuration data for the computing device in the computer memory of the computing device.

13 Claims, 3 Drawing Sheets

WIRELESS CONFIGURATION FOR A COMPUTING DEVICE

BACKGROUND OF THE INVENTION

1. Field of the Invention

The field of the invention is data processing, or, more specifically, methods, apparatus, and products for wireless configuration for a computing device.

2. Description of Related Art

Many computer logic devices incorporate non-proprietary expansion capabilities or adapter slots to allow features, technology, and capability expansion beyond the scope of the base logic device offering. Often these adapter slots are used to house expansion cards from independent vendors. The entity that combines these can either be the ultimate consumer or an intermediate business partner that sources components and builds custom computing systems to meet specific requirements of the end customer. Part of the integration of the expansion cards involves configuring the adapter to satisfactorily integrate with the computing system that the expansion card will be added to. Configuring an expansion card may require that the expansion card be removed from a manufacturer's packaging, inserted into a configuration system, and then repackaged for delivery to the end customer.

SUMMARY OF THE INVENTION

Methods, apparatus, and products for wireless configuration for a computing device, the computing device including computer memory, a wireless receiver, and a device configuration management module, including: receiving, by the device configuration management module via the wireless receiver, configuration data for the computing device, wherein the computing device is packaged in original equipment manufacturer ('OEM') packaging; and storing, by the device configuration management module, the configuration data for the computing device in the computer memory of the computing device.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
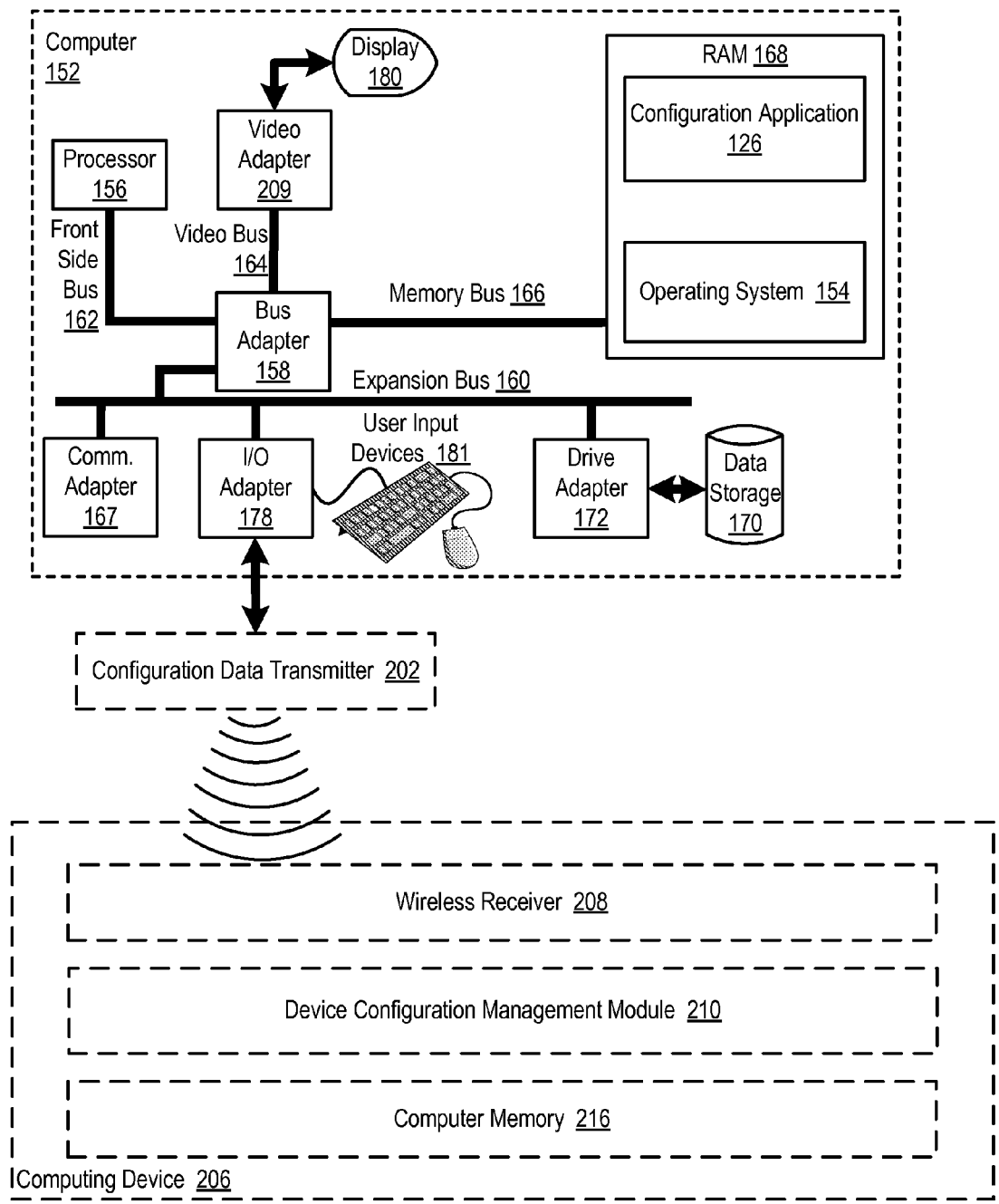
FIG. 1 sets forth a block diagram of automated computing machinery comprising an example computer useful in wireless configuration for a computing device according to embodiments of the present invention.

Example methods, apparatus, and products for wireless configuration for a computing device in accordance with the present invention are described with reference to the accompanying drawings, beginning with FIG. 1. FIG. 1 sets forth a block diagram of automated computing machinery comprising an example computer (152) useful in wireless configuration for a computing device according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a configuration application (126), a module of computer program instructions useful in wireless configuration for a computing device according to embodiments of the present invention. The configuration application (126) of FIG. 1 may be configured to receive configuration data for a computing device (206). The computing device (206) of FIG. 1 may be embodied, for example, as an add-on logic device such as an expansion card that is added to a computing system to expand the functionality of the computing system. Examples of such expansion cards may include a peripheral component interconnect ('PCI') expansion card, a peripheral component interconnect express ('PCIe') expansion card, and so on.

The computing device (206) of FIG. 1 includes computer memory (216). The computer memory (216) of FIG. 1 includes physical devices used to store computer program instructions or data for use in a computer or other digital electronic device. The computer memory (216) of FIG. 1 may be embodied, for example, as non-volatile random-access memory ('NVRAM'), flash memory, ferroelectric random-access memory ('FeRAM'), and so on. The computer memory (216) of FIG. 1 is often non-volatile memory that can retain the stored information even when not powered.

The computing device (206) of FIG. 1 also includes a wireless receiver (208). The wireless receiver (208) of FIG. 1 is a device for receiving a signal from another device without the use of a wire or similar physical connection between the wireless receiver and the signal transmitting device. Examples of such wireless receivers (208) can include an ultra-high frequency ('UHF') antenna, a radio frequency identification ('RFID') antenna or reader configured to receive an RFID signal, and so on. In the example of FIG. 1, the wireless receiver (208) may be part of the computing device (206) in the sense that the wireless receiver (206) is removably affixed to the computing device (206). For example, the wireless receiver (206) may be embodied as an RFID sticker attached to the computing device.

The computing device (206) of FIG. 1 also includes a device configuration management module (210). The device configuration management module (210) of FIG. 1 is a module of computing machinery configured to transmit the contents of a wireless signal into the computer memory (216) of the computing device (206). The device configuration management module (210) of FIG. 1 may be embodied, for example, as an RFID controller or other microcontroller that is operatively coupled to the wireless receiver (208) and to the computer memory (216) of the computing device (206). The device configuration management module (210) of FIG. 1 may therefore be configured to receive a wireless signal from the wireless receiver (208) and further configured to write information contained in the wireless signal to the computer memory (216) of the computing device (206).

In the example of FIG. 1, the configuration application (126) may be configured to receive configuration data for the computing device (206), for example, through the use of a graphical user interface ('GUI') presented to a system administrator. The configuration data is data that is used to control the operation of the computing device (206) when the computing device (206) is included in a larger computing system.

Consider an example in which the computing device (206) of FIG. 1 is embodied as a PCI expansion card. In such an example, the PCI expansion card may ultimately be inserted into an expansion card in a large scale computing system. Such a PCI expansion card must be configured to integrate properly into the computing system that the expansion card is inserted into. The PCI expansion card must be configured to integrate properly into the computing system that the expansion card is inserted into based on, for example, system firmware installed on the computing system, the operating system installed on the computing system, and so on. Such a PCI expansion card can be configured through the use of configuration data stored in a predefined configuration space of memory on the expansion card.

In the example of FIG. 1, the configuration application (126) may be configured to transmit the configuration data for the computing device (206) to a configuration data transmitter (202). The configuration data transmitter (202) of FIG. 1 is a module of computing machinery configured to emit a wireless signal. The configuration data transmitter (202) of FIG. 1 may be embodied, for example, as an RFID transmitter. The configuration data transmitter of FIG. 1 may be configured to transmit a particular wireless signal such as, for example, a signal that contains configuration data for the computing device (206). In such a way, the configuration application (126) effectively configures the configuration data transmitter (202) to transmit a particular signal that includes configuration data for the computing device (206).

In the example of FIG. 1, the configuration data transmitter (202) can therefore transmit the configuration data to the computing device (206). The computing device (204) receives configuration data for the computing device (206) via the wireless receiver (208) of the computing device (206) and stores the configuration data for the computing device (206) in the computer memory (216) of the computing device (206). In the example of FIG. 1, storing the configuration data for the computing device (206) in the computer memory (216) of the computing device (206) may be carried out by a device configuration management module (210) of the computing device (206). The device configuration management module (210) of FIG. 1 is a module of computing machinery configured to transmit the contents of a wireless signal into the computer memory (216) of the computing device (206). The device configuration management module (210) of FIG. 1 may be embodied, for example, as an RFID controller or other microcontroller that is operatively coupled to the wireless receiver (208) and to the computer memory (216) of the computing device (206). The device configuration management module (210) of FIG. 1 may therefore be configured to receive a wireless signal from the wireless receiver (208) and further configured to write information contained in the wireless signal to the computer memory (216) of the computing device (206).

Also stored in RAM (168) of the computer (152) is an operating system (154). Operating systems useful wireless configuration for a computing device according to embodiments of the present invention include UNIX™, Linux™, Microsoft XP™, AIX™, IBM's i5/OS™, and others as will occur to those of skill in the art. The operating system (154) and configuration application (126) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for wireless configuration for a computing device according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for wireless configuration for a computing device according to embodiments of the present invention include modems for wired dial-up communications, Ethernet (IEEE 802.3) adapters for wired data communications network communications, and 802.11 adapters for wireless data communications network communications.

Figure 2:
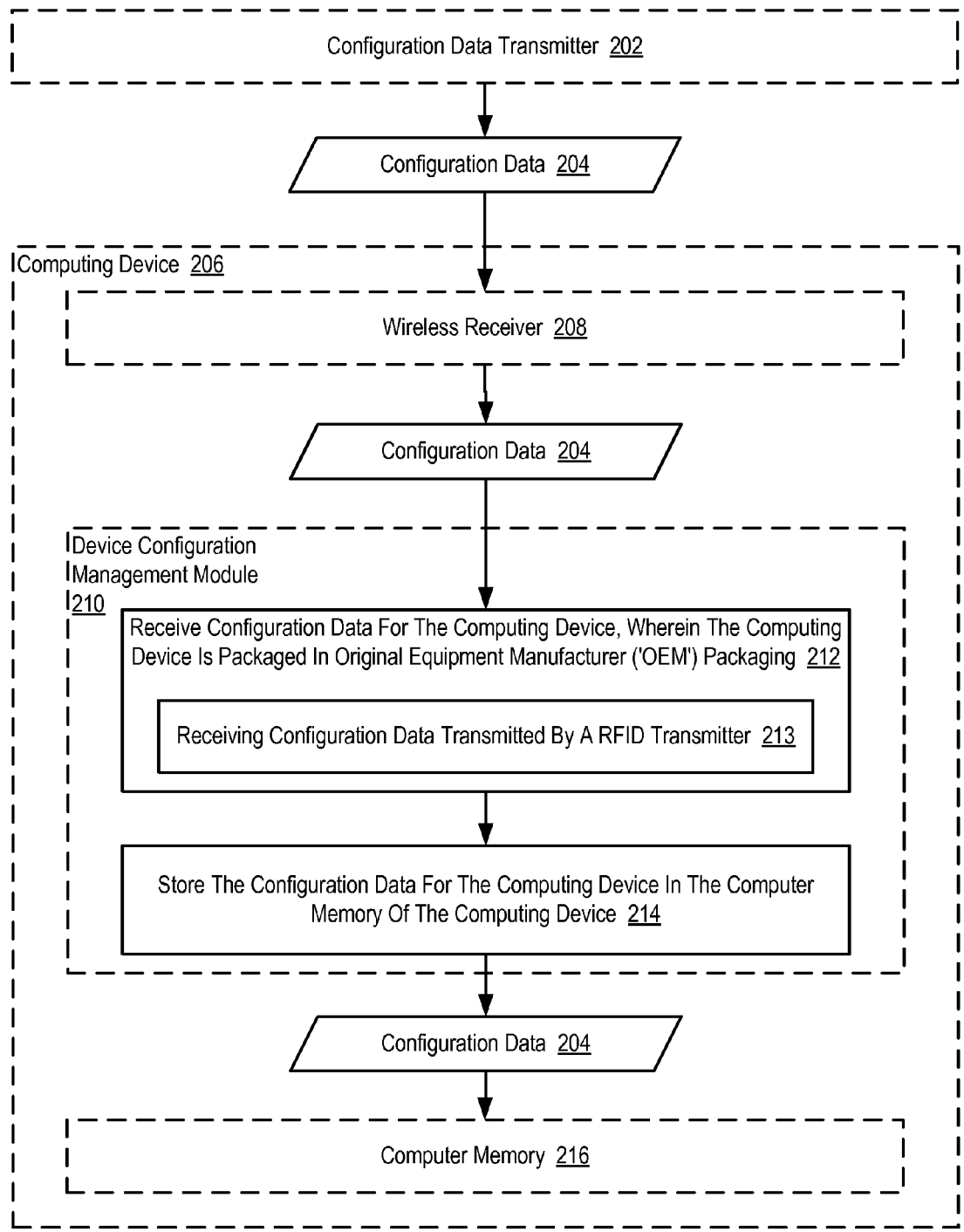
FIG. 2 sets forth a flow chart illustrating an example method for wireless configuration for a computing device according to embodiments of the present invention.

For further explanation, FIG. 2 sets forth a flow chart illustrating an example method for wireless configuration for a computing device (206) according to embodiments of the present invention. In the example method of FIG. 2, the computing device (206) may be embodied, for example, as an add-on logic device such as an expansion card that is added to a computing system to expand the functionality of the computing system. Examples of such expansion cards may include a PCI expansion card, a PCIe expansion card, and so on.

In the example method of FIG. 2, the computing device (206) includes computer memory (216). The computer memory (216) of FIG. 2 includes physical devices used to store computer program instructions or data for use in a computer or other digital electronic device. The computer memory (216) of FIG. 2 may be embodied, for example, as NVRAM, flash memory, FeRAM, and so on. The computer memory (216) of FIG. 2 is often non-volatile memory that can retain the stored information even when not powered.

In the example method of FIG. 2, the computing device (206) also includes a wireless receiver (208). The wireless receiver (208) of FIG. 2 is a device for receiving a signal from another device without the use of a wire or similar physical connection between the wireless receiver and the signal transmitting device. Examples of such wireless receivers (208) can include an ultra-high frequency ('UHF') antenna, a radio frequency identification ('RFID') antenna or reader configured to receive an RFID signal, and so on. In the example of FIG. 2, the wireless receiver (208) may be part of the computing device (206) in the sense that the wireless receiver (206) is removably affixed to the computing device (206). For example, the wireless receiver (206) may be embodied as an RFID sticker attached to the computing device.

In the example method of FIG. 2, the computing device (206) also includes a device configuration management module (210). The device configuration management module (210) of FIG. 2 is a module of computing machinery configured to transmit the contents of a wireless signal into the computer memory (216) of the computing device (206). The device configuration management module (210) of FIG. 2 may be embodied, for example, as an RFID controller or other microcontroller that is operatively coupled to the wireless receiver (208) and to the computer memory (216) of the computing device (206). The device configuration management module (210) of FIG. 2 may therefore be configured to receive a wireless signal from the wireless receiver (208) and further configured to write information contained in the wireless signal to the computer memory (216) of the computing device (206).

The example of FIG. 2 also includes a configuration data transmitter (202). The configuration data transmitter (202) of FIG. 2 is a module of computing machinery configured to emit a wireless signal. The configuration data transmitter (202) of FIG. 2 may be embodied, for example, as an RFID transmitter. The configuration data transmitter of FIG. 2 may be configured to transmit a particular wireless signal such as, for example, a signal that contains configuration data (204) for the computing device (206).

The example method of FIG. 2 includes receiving (212), by the device configuration management module (210) via the wireless receiver (208), configuration data (204) for the computing device (206). The configuration data (204) of FIG. 2 is data that is used to control the operation of the computing device (206) when the computing device (206) is included in a larger computing system. Consider an example in which the computing device (206) of FIG. 2 is embodied as a PCI expansion card. In such an example, the PCI expansion card may ultimately be inserted into an expansion card in a large scale computing system. Such a PCI expansion card must be configured to integrate properly into the computing system that the expansion card is inserted into. The PCI expansion card must be configured to integrate properly into the computing system that the expansion card is inserted into based on, for example, system firmware installed on the computing system, the operating system installed on the computing system, and so on. Such a PCI expansion card can be configured through the use of configuration data (204) stored in a predefined configuration space of memory on the expansion card.

In the example method of FIG. 2, the computing device (206) is packaged in original equipment manufacturer ('OEM') packaging when configuration data (204) for the computing device (206) is received (212) by the device configuration management module (210) via the wireless receiver (208). In the example of FIG. 2, the original equipment manufacturer is the entity that actually builds the physical computing device (206). In order to deploy the computing device (206), however, it is necessary to configure the computing device (206). Consider an example in which the computing device (206) is a PCIe expansion card purchased by a vendor of computing systems to be installed in a computing system at a client's site. In such an example, the expansion card is built by the original equipment manufacturer and packaged in OEM packaging prior to delivery to the vendor of computing systems. The expansion card, however, will need to be configured by the vendor of the computing system or by the client prior to installation into the computing system at the client's site. Embodiments of the present application allow for the expansion card to be configured without opening the OEM packaging and creating a need to repackage the expansion card.

In the example method of FIG. 2, receiving (212) configuration data (204) for the computing device (206) can include receiving (213) configuration data (204) transmitted by an RFID transmitter. For example, the configuration data transmitter (202) of FIG. 2 may be embodied as an RFID transmitter. Such an RFID transmitter may be configured to transmit a particular wireless signal such as, for example, a signal that contains configuration data (204) for the computing device (206). In such an example, the wireless receiver (208) may be configured to receive an RFID signal such that the computing device (206) can receive wireless communications from the RFID transmitter.

The example method of FIG. 2 also includes storing (214), by the device configuration management module (210), the configuration data (204) for the computing device (206) in the computer memory (216) of the computing device (206). In the example method of FIG. 2, storing (214) the configuration data (204) for the computing device (206) in the computer memory (216) of the computing device (206) may be carried out by writing the configuration data (204) to designated configuration space within the computer memory (216) of the computing device (206). Such configuration space can include data values that are utilized to determine how the computing device (206) will operate once installed within a larger computing system. The configuration space may include values identifying, for example, a communications protocol to be used the computing device (206), a data communications port to the used by the computing device (206), and so on.

In the example method of FIG. 2, the configuration data (204) may be embodied as digital data. Such digital data may be embodied, for example, as a data structure that includes fields corresponding to different operational aspects of the computing device (206). For example, a particular byte in the configuration data (204) may be reserved for a value that corresponds to a particular data communications protocol to be used by the computing device (206) while another byte in the configuration data (204) may be reserved for a value that corresponds to a packet size for data communications packets to be transmitted by the computing device (206). In such a way, a system administrator or other configuration manager can set values within the configuration data (204) to configure the computing device (206) for operation within a computing system.

In the example method of FIG. 2, the configuration data (204) may alternatively be embodied as metadata. Such metadata may be embodied, for example, as a structured document that includes entries and values corresponding to different operational aspects of the computing device (206). For example, a tag within the structured document may be reserved for a value that corresponds to a particular data communications protocol to be used by the computing device (206) while another tag in the structured document may be reserved for a value that corresponds to a packet size for data communications packets to be transmitted by the computing device (206).

In the example method of FIG. 2, because configuration data (204) for the computing device (206) is received (212)

and stored (214) in computer memory (216) of the computing device (206) while the computing device (206) is packaged in OEM packaging, configuring the computing device (206) is more efficient. Configuring the computing device (206) can occur without opening the OEM packaging, without needing to connect the computing device (206) to configuration machinery such as another computing system, and without needing to repackage the computing device (206).

In the example method of FIG. 2, the computing device (206) is frequently described as being embodied as an expansion card. Readers will appreciate, however, that the computing device (206) may be embodied as any type of computing device that includes computer memory, a wireless receiver, and a device configuration management module as described above.

Figure 3:
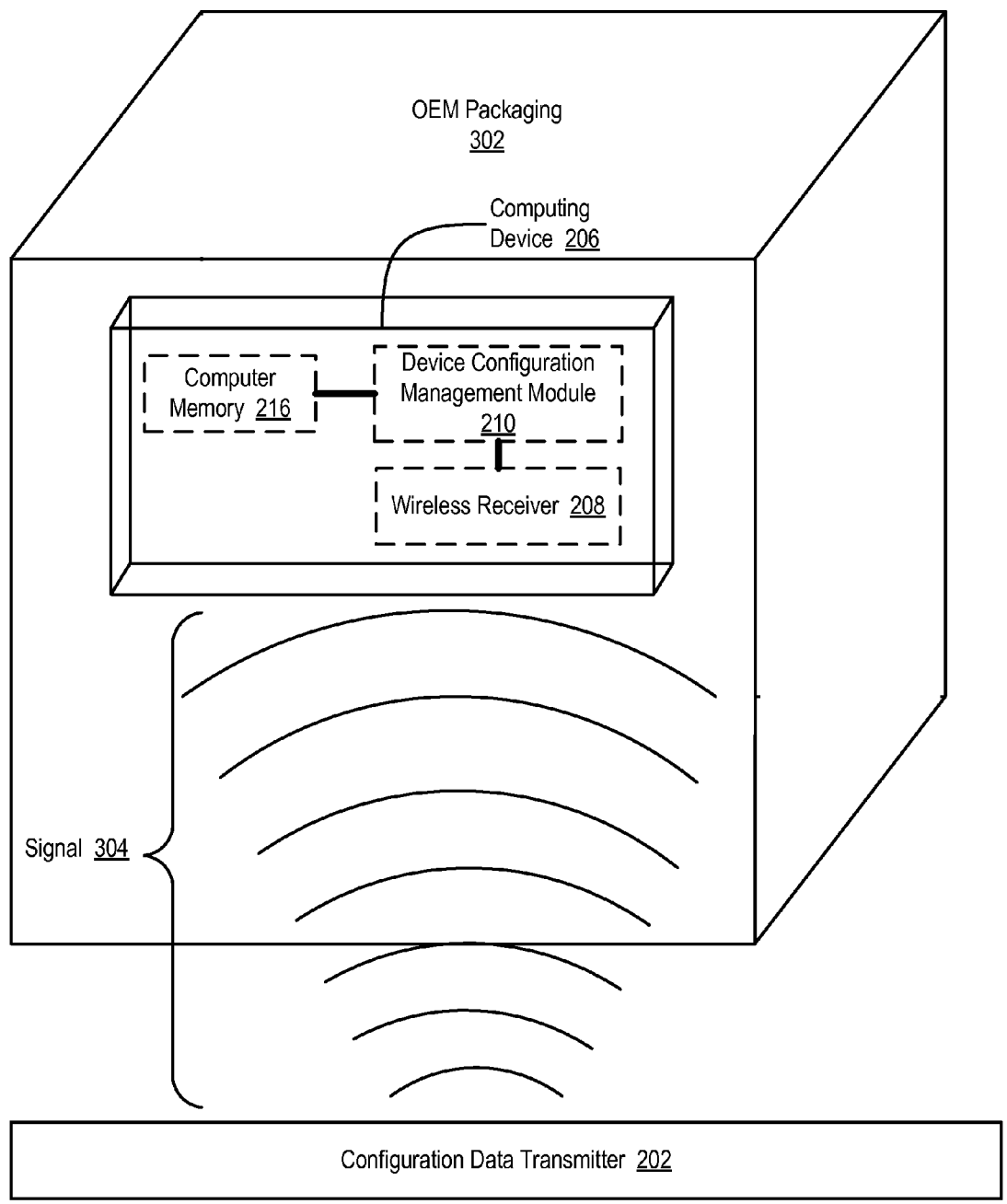
FIG. 3 sets forth a block diagram of a computing component that can be wirelessly configured according to embodiments of the present invention.

For further explanation, FIG. 3 sets forth a block diagram of a computing component (206) that can be wirelessly configured according to embodiments of the present invention. In the example of FIG. 3, the computing component (206) is packaged in OEM packing (302), illustrated here as a box. The computing component (206) of FIG. 3 includes a wireless receiver (208) operatively coupled to a device configuration management module (210). The computing component (206) of FIG. 3 also includes computer memory (216) that is operatively coupled to the device configuration management module (210).

The example of FIG. 3 also includes a configuration data transmitter (202). The configuration data transmitter (202) of FIG. 3 is a module of computing machinery configured to emit a wireless signal (304). The configuration data transmitter (202) of FIG. 3 may be embodied, for example, as an RFID transmitter. The configuration data transmitter (202) of FIG. 3 may be configured to transmit a particular wireless signal (304) such as, for example, a signal that contains configuration data for the computing device (206). In the example of FIG. 3, the configuration data transmitter (202) may be mounted, for example, at a shipping station or other convenient location such that simply placing the OEM packing (302) that includes the computing device (206) at the shipping station will result in the wireless signal (304) being transmitted to the wireless receiver (208) of the computing device (206). In such a way, the computing device (206) may be wirelessly configured in accordance with embodiments of the present application by receiving, by the device configuration management module (210) via the wireless receiver (208), configuration data for the computing device and storing, by the device configuration management module (210), the configuration data for the computing device (206) in the computer memory (216) of the computing device (206) as described above with reference to FIG. 2.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of wireless configuration for a computing device,
    the computing device including computer memory, a wireless receiver, and a device configuration management module, the method comprising:
    receiving, by the device configuration management module via the wireless receiver,
    configuration data for the computing device, wherein the computing device is packaged in original equipment manufacturer ('OEM') packaging and the configuration data is metadata that includes a structured document with entries and values corresponding to different operational aspects of the computing device, including a first tag within the structured document that includes a value that corresponds to a particular data communications protocol to be used by the computing device and a second tag in the structured document that includes a value that corresponds to a packet size for data communications packets to be transmitted by the computing device; and
    storing, by the device configuration management module, the configuration data for the computing device in the computer memory of the computing device;
    wherein the computing device is an expansion card.

2. The method of claim 1 wherein the wireless receiver is an ultra high frequency ('UHF') antenna.

3. The method of claim 1 wherein the computer memory is non-volatile random access memory ('NVRAM').

4. The method of claim 1 wherein receiving configuration data for the computing device further comprises receiving configuration data transmitted by a radio-frequency identification ('RFID') transmitter.

5. An apparatus for wireless configuration for a computing device,
    the computing device including computer memory, a wireless receiver, and a device configuration management module, the apparatus configured for:
    receiving, by the device configuration management module via the wireless receiver,
    configuration data for the computing device, wherein the computing device is packaged in original equipment manufacturer ('OEM') packaging and
    the configuration data is metadata that includes a structured document with entries and values corresponding to different operational aspects of the computing device, including a first tag within the structured document that includes a value that corresponds to a particular data communications protocol to be used by the computing device and a second tag in the structured document that includes a value that corresponds to a packet size for data communications packets to be transmitted by the computing device; and storing, by the device configuration management module, the configuration data for the computing device in the computer memory of the computing device;
    wherein the computing device is an expansion card.

6. The apparatus of claim 5 wherein the wireless receiver is an ultra high frequency ('UHF') antenna.

7. The apparatus of claim 5 wherein the computer memory is non-volatile random access memory ('NVRAM').

8. The apparatus of claim 5 wherein transmitting the configuration data for the computing device further comprises transmitting configuration data transmitted by a radio-frequency identification ('RFID') transmitter.

9. A computer program product wireless configuration for a computing device,
    the computing device including computer memory, a wireless receiver, and a device configuration management module, the computer program product disposed upon a computer readable medium, wherein the computer readable medium is not a signal, the computer program product comprising computer program instructions that, when executed, cause a computer to carry out the steps of:
    receiving, by the device configuration management module via the wireless receiver,
    configuration data for the computing device, wherein the computing device is packaged in original equipment manufacturer ('OEM') packaging and
    the configuration data is metadata that includes a structured document with entries and values corresponding to different operational aspects of the computing device, including a first tag within the structured document that includes a value that corresponds to a particular data communications protocol to be used by the computing device and a second tag in the structured document that includes a value that corresponds to a packet size for data communications packets to be transmitted by the computing device; and storing, by the device configuration management module, the configuration data for the computing device in the computer memory of the computing device;
    wherein the computing device is an expansion card.

10. The computer program product of claim 9 wherein the wireless receiver is an ultra high frequency ('UHF') antenna.

11. The computer program product of claim 9 wherein the computer memory is non-volatile random access memory ('NVRAM').

12. The computer program product of claim 9 wherein receiving configuration data for the computing device further comprises receiving configuration data transmitted by a radio-frequency identification ('RFID') transmitter.

13. The computer program product of claim 9 wherein the computer readable medium comprises a storage medium.

* * * * *